United States Patent

[11] 3,631,850

[72] Inventor: Joseph Emile Levasseur
Richmond, Va.
[21] Appl. No. 876,566
[22] Filed Nov. 13, 1969
[45] Patented Jan. 4, 1972
[73] Assignee: The United States of America as represented by the Secretary of the Navy
Continuation-in-part of application Ser. No. 656,951, July 28, 1967, now abandoned. This application Nov. 13, 1969, Ser. No. 876,566

[54] PRESSURE TRANSDUCER APPARATUS FOR MICROHEMOCIRCULATION STUDIES
7 Claims, 6 Drawing Figs.

[52] U.S. Cl. .................................................. 128/2.05 D, 73/398 AR, 128/2.05 E
[51] Int. Cl. .................................................. A61b 5/02
[50] Field of Search .......................................... 128/2.05 D, 2.05 E, 2.05 Q, 2.05 P, 2; 73/398 AR, 406; 260/503.5

[56] References Cited
UNITED STATES PATENTS
| 3,499,434 | 3/1970 | Ullrich et al. | 128/2.05 D |
| 3,349,623 | 10/1967 | Pastan | 73/398 AR |
| 3,058,348 | 10/1962 | Statham | 73/398 AR |

FOREIGN PATENTS
| 529,302 | 6/1955 | Italy | 128/2.05 D |

OTHER REFERENCES
The Merck Index, 7th Edition, pp. 964 & 1,013– 1,014, RS 356, M524, 1960, C.26
Hathaway Publication, Jan. 1949, 2 pages
Biotronex Bulletin, Sept. 1967

Primary Examiner—Richard A. Gaudet
Assistant Examiner—Kyle L. Howell
Attorneys—R. S. Sciascia and Paul N. Critchlow ABSTRACT: The transducer has a closed chamber or pressure dome formed of a flat base having a diaphragm portion and sidewalls that converge into a central opening by which it is coupled to a tube or microcannula which, preferably, is a flexible polyethylene tube having a tip or needle at its end for insertion into microvessels. A pressure transmitting fluid characterized by having a high wettability, low surface tension and physiological compatibility fills the pressure dome and the tube so that circulatory pressure changes are transferred to the diaphragm to cause diaphragm displacement. A sensor is responsively coupled to the diaphragm to detect the displacements and provide the data for the microhemocirculatory studies. A greatly improved frequency response of the transducer is achieved by minimizing the volume of the chamber, the preferred chamber volume being no greater than about 0.25 cc. Also, the internal diametric area of the cannula or tube preferably is no greater than about 0.28 mm. Improved operation results when the design parameters of the transducers are based upon the following relationship:

$$\text{Chamber volume} = \frac{\text{(volume displacement)(cannula ID area)}}{K \text{ (diaphragm area)}}$$

in which $K$ is a dimensionless proportionality constant having a value of about $3.789 \times 10^{-6}$.

INVENTOR
JOSEPH E. LEVASSEUR

BY
Erwin F. Johnston
ATTORNEY.

PRESSURE TRANSDUCER APPARATUS FOR MICROHEMOCIRCULATION STUDIES

The present invention is a continuation-in-part of a copending patent application, Ser. No. 656,951 filed in the name of the present inventor July 28, 1967, now abandoned, this copending application being titled "Microhemocirculation Pressure Transducer."

The invention described herein may be manufactured and used by or for the Government of the United States of America for governmental purposes without the payment of any royalties thereon or therefor.

BACKGROUND OF THE INVENTION

The present invention relates to pressure transducers and, more particularly, to physiological pressure transducers of a volume-displacement, electromanometer type.

Basic physiological mechanisms involve to a substantial degree the study of circulatory systems extending to the microscopic tissue level and to microhemocirculatory studies at this level. For example such studies contribute to an understanding of various abnormal vascular responses such as those concerned with the development of hypertension. Small and large animals, as well as man, provide the subjects for such studies and the use of pressure transducers to investigate phasic blood pressure variations in the subjects is quite common. Such transducers must be capable of detecting not only the frequency of the basic heart rate but also components within the curve of this basic rate which occur in very small fractions of a second. Consequently, the frequency response of these transducers should be at least tenfold of the frequency of the smallest basic curve component involved.

Several pressure transducer systems have been proposed one of these being relatively widely used pressure pick up instrument known as the Statham P23Gb pressure transducer which, in general, uses a contained fluid body to transmit pulsatile blood pressures to a diaphragm that, in turn, is coupled to a sensor or sensing disc to provide readings proportional to the volume displacements of the diaphragm by the transferred pressures. The major portion of the pressure-transmitting fluid is contained in a pressure dome or chamber formed in part by the diaphragm.

The present invention improves the frequency response of the Statham P23Gb pressure transducer and further teaches a manner of forming physiological pressure transducers capable of providing accurate data for microhemocirculatory studies. As will be described, the principal discovery of the present invention is that markedly improved operation results by utilizing a pressure dome of a chamber volume which is minimized to the greatest degree possible consistent with other design criteria such as the size of the tube that couples the pressure dome to the circulatory system and the area of the diaphragm that forms part of the pressure dome. More specifically, it has been found that a chamber volume no greater than about 0.25 cc. increases the linear frequency response of the system by about 50 percent and also increases the natural frequency by approximately 85 percent. By way of contrast, it can be here noted that the internal volume of the pressure dome of the Statham system is approximately 0.43 cc. so that the present transducer decreases this volume to above 6 percent. Also, in the present transducer, the tube or cannula coupling the pressure dome to the circulatory system is quite small and preferably is no greater than about 0.28 mm. ID. Consistent with the reduced chamber volume and small tube area, the present invention provides design parameters for a transducer which are based upon the following relationship:

$$\text{Chamber volume} = \frac{(\text{volume displacement})(\text{cannula ID area})}{K (\text{diaphragm area})}$$

in which $K$ is a dimensionless proportionality constant having a value of $3.789 \times 10^{-6}$. Although the subsequent detailed description will be principally with regard to the manner by which the present teachings improve the standard Statham arrangement, it also should be recognized that the invention also applies to any physiological pressure transducer corresponding in type to the Statham transducer, such transducers generally being known as volume-displacement electromanometers.

A primary object of the present invention is to provide a physiological pressure transducer having a dynamic response suitable for microhemocirculatory studies or, in other words, suitable for studies of the phasic blood pressure curves of microvessels of the circulatory system, such microvessels being defined as those within a size range of 5–30 microns.

Another object is to provide a stable inexpensive transducer of the Statham P23Gb pressure transducer type.

A further object is to provide a microhemocirculation pressure transducer according to the previous objects the transducer system being so arranged as to permit the use of the transducer at a location remote from the patient without significant loss of its dynamic response characteristics.

A more specific object is to improve the Statham P23Gb pressure transducer system.

BRIEF DESCRIPTION OF THE DRAWINGS

A characteristic embodiment of the invention as illustrated in the accompanying drawings of which.

DETAILED DESCRIPTION OF THE INVENTION

Figure 1:
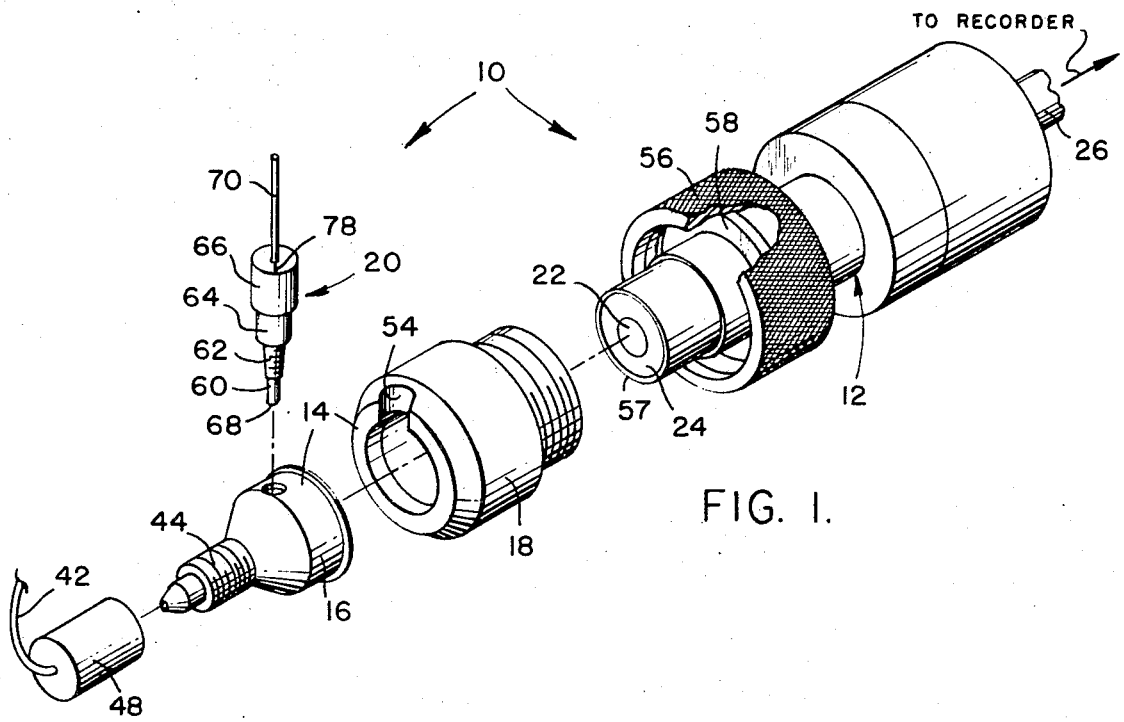
FIG. 1 is an exploded isometric view of the present invention with a portion cut away to show various details.
Figure 2:
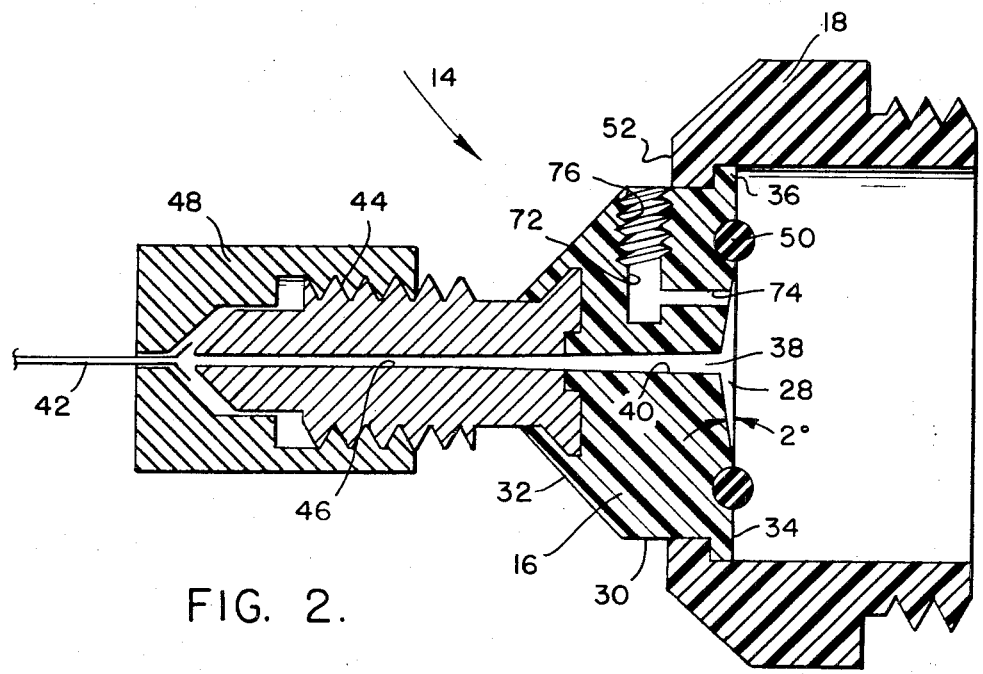
FIG. 2 is an enlarged longitudinal cross section of the ring dome assembly.

Referring to FIG. 1, the present transducer, generally designated by numeral 10, includes a pressure sensor, such as strain gage 12, and a ring dome assembly 14. The dome assembly, as also shown in FIG. 2, includes a dome body 16 and a generally tubular threaded male fitting 18. A flushing valve 20 is threaded radially into dome body 16, the function of this flushing valve being to fill the interior cavities of the transducer with a pressure-transmitting fluid which in theory at least should provide a solid or gas-free uninterrupted fluid body between the circulatory vessel being studied and the diaphragm of the transducer which drives the sensor in a manner which will be described. Since this fluid contacts the vascular system of the subject being studied, it must be physiologically inert. The transducer 10 shown in FIG. 1 is structurally identical to the prior art pressure transducer known as the Statham pressure transducer P23Gb with the exception of the size of pressure dome 16 and the structure and arrangement of flushing valve 20 which will be described in more detail hereinafter.

Strain gage 12 may be provided in a variety of manners since its primary function is to convert physical movements of a diaphragm to electrical signals which then can be recorded to provide the desired information relative to the pressures which initially induced the physical movements. A preferred strain gage is one employing a Wheatstone bridge principle, the bridge including two pairs of wires (not shown) coupled to a central circular diaphragm 22 that is slidably mounted for longitudinal movement within an annular element 24. The wires work in pairs to the extent that volume displacement of the diaphragm in one direction varies the length and therefore the resistance of one of the pairs, while displacement in another direction varies the resistance of the other of the pairs. The changes in electrical resistance are a measure of the pressures upon diaphragm 22. Such an arrangement, which is commercially available, may be coupled by a cable 26 to a recorder (not shown) which may be a Sanborn direct writing instrument or an Electronics for Medicine cathode oscilloscope. The direct writing instrument will produce paper graphs such as those shown in FIG. 3 subsequently to be described. The Wheatstone bridge principle is preferred primarily because of its stability. However, other arrangements, such as a Sanborn capacitor tube having two electrodes relatively movable in response to diaphragm displacement or an induction-type tube may be substituted. The latter type utilizes a coil within a coil, the inner coil being relatively movable in response to the diaphragm movements. These other types presently do not seem to have the stability and therefore the reliability of the Wheatstone bridge type, although some can produce better frequency responses.

One of the features of the present invention resides in the discovery that a substantial reduction in the size of the prior art dome provides transducer 10, or other corresponding transducers, with a surprisingly increased dynamic response which enables the detection of phasic blood pressure changes of very short interval. As to relative sizes, the Statham pressure dome, as stated, has an interior volume of 0.43 cc. while the pressure dome of the present embodiment is about 0.025 cc. or only about 6 percent of the Statham dome volume.

As shown in FIG. 2, dome 16 has a generally cylindrical rear portion 30, a frustoconical top portion 32 and a base 34 which is partially formed by an outwardly extending annular flange 36 the function of which will be described later. Interiorly, the dome is formed with a chamber 28 centered within base 34 and, at its apex 38, the chamber is in communication with a longitudinally tapered bore 40. One manner of assuring the minimum volume of chamber 28 is to minimize the internal angle between its base 34 and its apex 38, this angle being referred to as the convergence angle of the sidewalls of the chamber. Most suitably, the angle should be about 2° although improved results are obtained within a range of 1.5° to 2.5°. By so reducing the volume of the chamber, the fluid solution contained in it is greatly reduced with the result that the damping effect of the fluid solution also is reduced and its dynamic response increased. One of the features of the invention aside from the minimum chamber volume is the use of microcannula or very small tubing 42 to permit the use of the transducer at remote or spaced distances from the patient without causing inordinate loss of dynamic response. The extreme end of tubing 42 is fitted in the customary manner with a microneedle (not shown) for insertion into a microvascular vessel. Since microvessels have been defined as those within a size range of 5-30 microns, it will be apparent that the microneedle must have a tip smaller than the vessel into which it is inserted and therefore must be of correspondingly smaller size. Tubing 42 is coupled to the transducer by a threaded male fitting 44 having a longitudinal bore 46 which may be molded at one end into frustoconical portion 32 of the dome with its bore 46 axially aligned with dome bore 40.

A tubing adapter 48 also may be employed, this adapter having internal threads engaging threads formed on male fitting 44 to axially align the bore of tube 42 with longitudinal bore 46.

The fluid solution to be used within tube 42 is the same solution used in dome chamber 28 and in longitudinal passageways 46. A specific solution to be described provides another feature of the present invention and, although this specific solution or any other obviously will produce a damping effect upon the transducer, the added solution contained in tubing 42 can be afforded since the dynamic response of the present transducer is so greatly increased. Tubing is desirable since it permits the transducer to be placed at a remote position in which it will not block or interfere with the operator's field of view. However, if the tubing is not desired, a microneedle may be connected directly to the dome in any suitable manner such as by the use of molding techniques.

Transmission of phasic pressure changes is, of course, achieved by transferring these pressure changes through the fluid to diaphragm 22 of the strain gage and, for this purpose, dome chamber 28 should be hermetically sealed. The seal may be achieved by an O-ring 50 encircling dome chamber 28 and diaphragm 22, this O-ring being mounted in base 34 in the manner shown in FIG. 2 The seal of the O-ring is created by the engagement of the ring with annular element 24 disposed just outside the periphery of diaphragm 22. The connecting means included threaded male fitting 18 slidable along cylindrical portion 30 of the dome, the fitting having an inwardly extending annular flange 52 adapted to engage with dome flange 36 in the manner shown. Strain gage 12 also is provided with a threaded female fitting 56 slidable along the strain gage and provided with an annular base end (not shown) adapted to engage an outwardly extending annular flange 58 about the body of the strain gage. Sealing pressure contact between O-ring 50 and annular element 24 is achieved by threading fitting 18 into threaded female fitting 56. Maximum sealing pressure is restricted when protruding outside edge 57 of annular element 24 abuts against base 34, the pressure restriction safeguarding against excessive compression of the O-ring such as might produce injury to diaphragm 22.

Valve 20 is used to fill the interior chamber and the bores of the transducers with the pressure-transmitting fluid and, as already indicated, this fluid must completely fill all interior voids so as to cause the fluid to contact the microvessels being studied. Valve 20 also functions as a flushing valve permitting the chamber and internal cavities to periodically flush the tube during use. Most suitably, the valve is constructed of nylon and provided with a bottom cylindrical portion 60, a radially enlarged cylindrical portion 64 and another larger cylindrical top portion 66. A longitudinal bore extends through all of these portions with the exception of bottom cylindrical portion 60 where the bore stops short of the bottom and is in fluid communication with a transverse passageway 68. One end of a rigid tubular member 70 is inserted within the bore of top portion 66 while the other end of this tubular element receives another tube (not shown) in communication with a solution source used for flushing purposes. Dome body 16 accommodates the valve by being provided with a transverse passageway 72 (FIG. 2) and a longitudinal passageway 74, the latter communicating with chamber 28 through transverse passageway 60 of the valve. The communication is effected a slight distance above the bottom of passageway 72. A threaded portion 76 receives threaded portion 62 of the valve and the bottom portion of passageway 72 is adapted to slidably and receivably receive bottom cylindrical valve portion 60.

When the bottom of valve portion 60 is located below longitudinal dome passageway 74 the latter passageway is sealed with respect to transverse passageway 68 and tube 70. However, tube 70 can be rotated into a position opposite passageway 74 to effect communication therebetween. To permit manual operation, valve 20 may be provided with a mark 78 aligned with passageway 68, this mark permitting the operator to flush the transducer simply by turning the valve towards the rear of the instrument. The size of cylindrical portion 64 should permit it to slidably pass within cutout 54 so as to eliminate any binding against fitting 18 when ring dome assembly 14 is properly affixed to strain gage 12. A slight tapering of the valve thread 62, as well as the nylon material of the valve, facilitate the manual operation. As will be appreciated, the interior volume of the valve, which normally is in communication with the chamber 28, should be as small as possible consistent with achieving the functions for which the valve is intended. Small volume, of course, is desired to reduce the damping effect of the solution which will enter these valve passageways.

In preparing transducer 10 for an operation, cable 26 is coupled to the recorder (not shown), tubing adapter 48 is threaded to male fitting 44 and the extreme end of small tubing 42 is fitted with its microneedle. Dome chamber 28, as well as the interior bores of the transducer and the tubing, then may be filled with the fluid solution through flushing valve 20. When the microneedle is inserted into the blood vessel to be tested, this solution is subjected to phasic pressure changes sensed by strain gage 12. During the operation of the transducer it is necessary to periodically flush the solution within the dome out through the microneedle. This is accomplished simply by rotating the flushing valve which will be under pressure until mark 76 is positioned toward the rear of the transducer.

As previously indicated, one of the present features is the use of a particular fluid solution to transmit pressures to the transducer diaphragm. In this regard, it may be noted that solutions in common use in transducers of the present type mostly are sodium chloride aqueous solutions, such solutions being normal saline solutions physiologically compatible with the vascular systems being studied. However, one difficulty experienced with such normal saline solutions is that it becomes very difficult to completely fill dome chamber 28 without trapping tiny air bubbles around the internal periphery. In working with microvessels or in using instruments having significantly larger fluid volumes, the necessity of providing an absolutely gas-free solution is not as critical. However, since the present invention is characterized in part by the use of extremely small liquid volumes, the presence of any gas bubbles interferes with efficient operation to a far greater degree.

Figure 5:
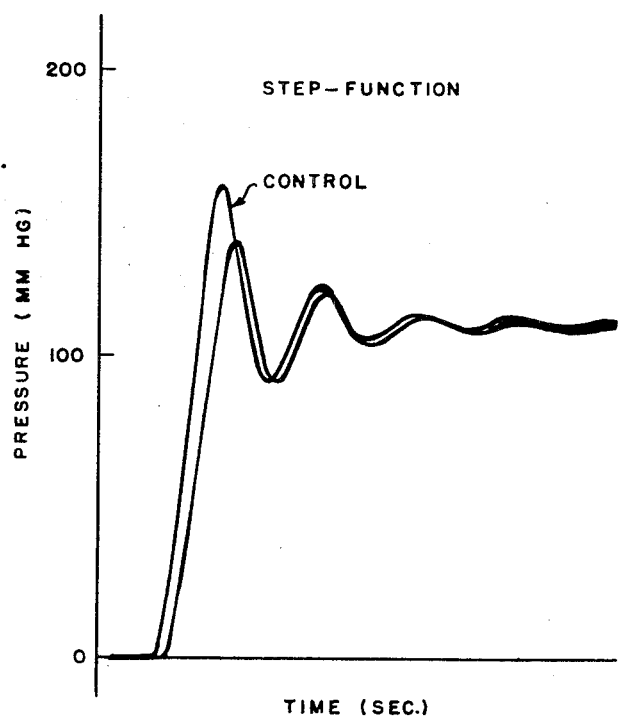
FIG. 5 illustrates the phase lag of the new microhemocirculation pressure transducer before flushing with a physiological inert solution provided by the present invention.
Figure 6:
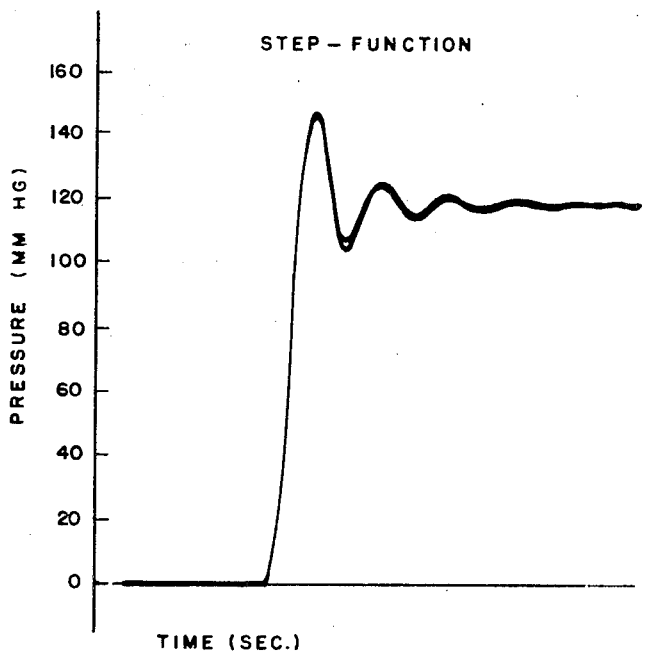
FIG. 6 is a graph showing essentially no phase lag when the new microhemocirculation pressure transducer is employed with the present physiological inert solution.

These difficulties can be offset by using particular solutions in place of the normal saline solution. In general, the solutions presently employed are bile salt solutions which are not physiologically harmful or, in other words, are physiologically compatible to the same extent that the saline solutions are compatible. Further, these solutions are characterized by the fact that they possess high wettability and low surface tension so as to be capable of filling the internal cavities of the transducers in a gas-free manner to provide a solid liquid body between the pressure source and the diaphragm. In particular, an aqueous solution of 0.001 molar sodium taurocholate in 0.9 percent sodium chloride significantly enhances the pressure transmission. Another bile salt solution having like characteristics and possessing like advantages in the present context is a solution of sodium dehydrocholate. It is expected that other bile salts having the same physical characteristics would also be appropriate. A comparison between the pressure response characteristics of a transducer using a normal saline solution and one using the present bile salts solution is illustrated in FIGS. 5 and 6. These graphs, which represent recorder data, illustrate the response of the modified Statham P23Gb pressure transducer to a sudden impression of increased static pressure of the type produced by a cyclic pressure test apparatus such as is described in U.S. Pat. No. 3,453,861 issued July 8, 1969 to the present inventor and titled "Square Wave Fluid Pressure Generator." The graph in FIG. 5 illustrates that a phase lag, which was calculated to be approximately 36°, existed when the normal saline solution was employed. The data provided by the graph of FIG. 6 shows that use of the present bile salt solution results in essentially no phase lag whatsoever.

The new solution may be prepared in the following manner: 0.1344 grams of pure sodium taurocholate is weighed on an analytical balance and transferred to a 250 ml. volumetric flask. Heparin sodium then is added to an amount equivalent to 500 USP units followed by a few crystals of thymol and of bromcresol purple dye (pH 5.2–6.8). Isotonic sodium chloride the is added and the solution thus made to volume. After stirring it is transferred to an appropriate flask for gentle heating to near its boiling point. Care must be exercised in heating the solution since unless it is continuously stirred it splatters violently upon reaching the boiling point which is 101° C. Generally the heat is applied by an electric tape that can be turned off when the first signs of turbulence appear. Comparing this new solution with the normal saline solution it is found that viscosity is not significantly reduced although the surface tension of the new solution drops to 55 percent of the saline solution.

Figure 3:
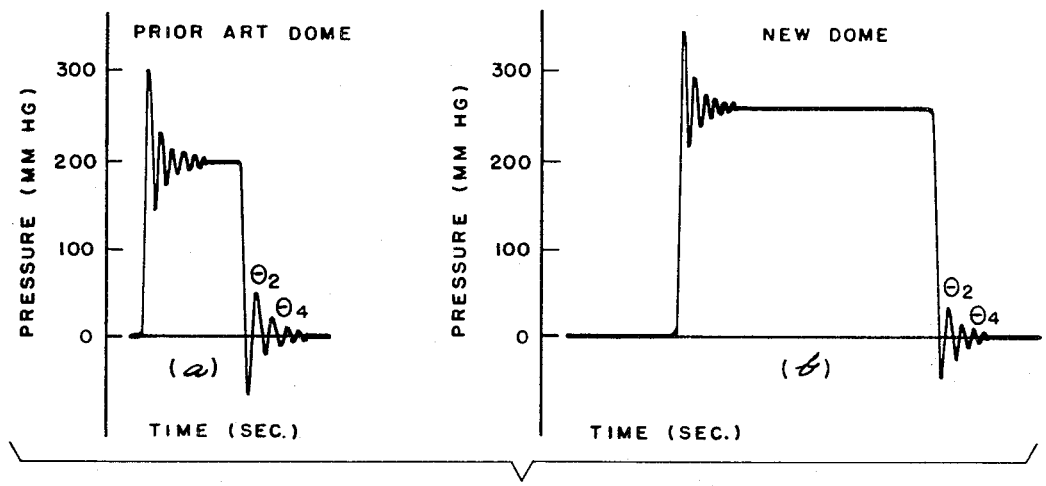
FIG. 3($a$) is a pressure step-function response record of a Statham P23Gb pressure transducer and FIG. 3($b$) is a pressure step-function record of the same pressure transducer using a small pressure dome having a reduced volume characteristic of the present invention.

To provide a comparison of the dynamic responses of the prior art transducer and the present improved transducer, both were individually connected to the square wave fluid pressure generator described in the referenced copending patent application and the results recorded in the manner shown in FIG. 3. The pressure waves shown in this figure are composed of two step functions, namely, a positive step function produced by a sudden increase in static pressure and a negative step produced by a sudden decrease in this static pressure. The negative step is indicative of the dynamic response of the system since it can be made to oscillate freely when the system is at equilibrium whereas the positive step is composed of forced oscillations.

Figure 4:
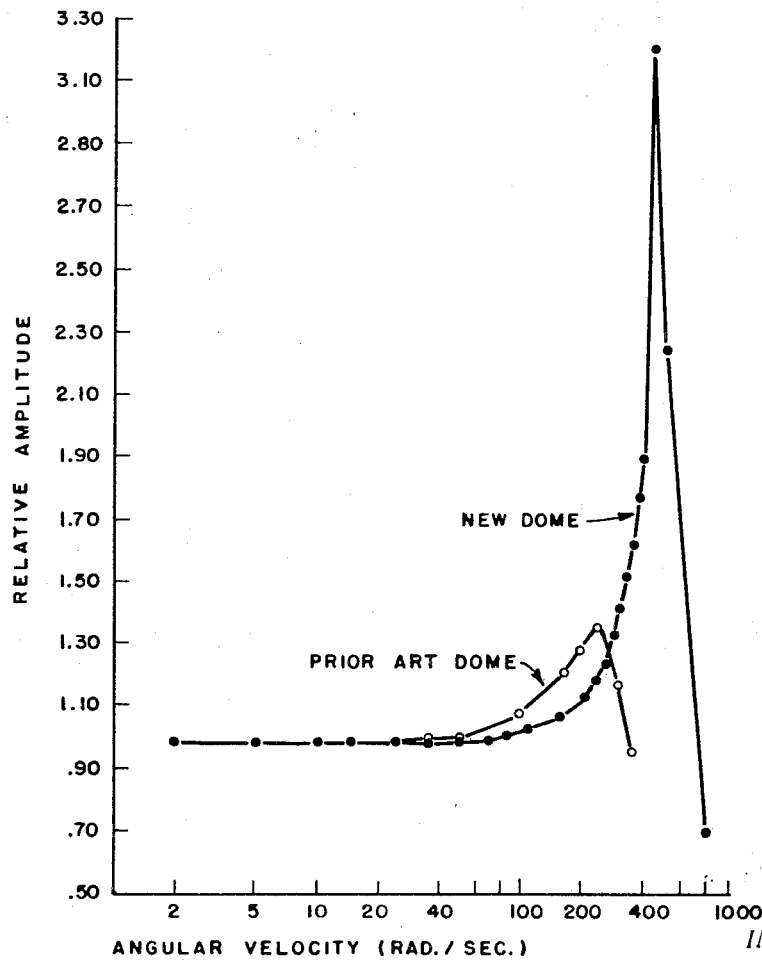
FIG. 4 is a computed graph illustrating a comparison of the dynamic response characteristics between the prior art dome and the new dome for the microhemocirculation pressure transducer.

The amplitudes and frequencies of the oscillations of the transient portion of the negative steps in the chart of FIG. 3 provide data for computing a dynamic response comparison between a pressure transducer utilizing the prior art dome and a transducer utilizing the present ring dome assembly 14. Such computations are illustrated in graph form in FIG. 4 which is a plot of relative amplitude versus angular velocity (radians per second). In this graph relative amplitude is equal to $$\left[\left(\frac{K}{m}-w'^2\right)^2+\left(\frac{r}{m}\cdot w'\right)^2\right]^{1/2}$$

where:
$K=$ the spring constant, i.e., the modulus of elasticity which when multiplied by the displacement of the diaphragm 22 provides the measure of elastic restoring force of the transducer
$m=$ the mass of the diaphragm 22 (essentially)
$w'=$ the angular velocity of oscillation
$r=$ the resistance in the system This graph shows that the unmodified pressure transducer exhibits a nearly flat response up to about 70 radians per second and a damped natural frequency of 240 radians per second. In contrast, the modified pressure transducer of the present invention has a nearly linear response up to about 105 radians per second and a damped natural frequency of 450 radians per second. This data is for pressure transducers and their respective domes without the small tubing 42 and the microneedle. Based upon this data, it will be seen that the present dome assembly has improved the linear frequency response of the prior art transducer by approximately 50 percent and the natural frequency by about 85 percent.

It will be recognized that the foregoing description has been concerned primarily with a manner of obtaining improved operations of the Statham P23Gb pressure transducer when this transducer is used for microhemocirculatory studies. In particular, the improvements achieved are due to a considerable degree to the reduction in the size of dome chamber 28 and, as has been described, the reduction of the Statham chamber is achieved by using a convergence angle of about 2° between the base of the chamber and its converging sidewalls. Also, the improvements in the Statham arrangement contemplate the use of particular bile salt solutions as pressure-transmitting media and, in addition, the arrangement is one which permits the use of microcannula or tubing 42 to permit the instrument to be placed a convenient distance from the circulatory vessel being studied.

Although these specific improvements in the actual structure of the Statham transducer are uniquely advantageous, it also should be recognized that the present teachings are not intended to be limited necessarily to the particular structure of the Statham transducer but instead, extend generally to other transducers related to the Statham transducer to the extent they are physiological pressure transducers of a volume-displacement, electromanometer type. More specifically, the teachings are applicable to any transducer intended for microcirculatory studies provided the transducer is of a type having a diaphragm contained in a pressure dome which is communicated through microcannula with the circulatory pressure source.

Specifically, it has been found that the improved transducer operation which has been described above can be achieved for transducers other than the Statham transducer if the design parameters of the transducer being constructed are based upon the following relationship:

$$\text{Chamber volume} = \frac{(\text{volume displacement})(\text{cannula ID area})}{K\ (\text{diaphragm area})}$$

in this relationship, $K$ is a dimensionless proportionality constant having a value of about $3.789 \times 10^{-6}$. In the construction of the transducer it should be recalled that a critical factor involved the chamber volume which for the Statham transducer is about 0.25 cc. Other transducers should have a volume no greater than 0.25 cc. Also, depending upon other factors such as volume displacement, diaphragm area, tubing size and the materials being used, the volume can be considerably less. Thus, in any design consideration, the chamber volume of 0.25 cc. can be taken as a fixed upper limit. Also, the internal diametric area of cannula or tube 42 has a fixed upper limit of about 0.28 mm. The other parameters of the relationship, such as volume displacement (cm.$^3$) and diaphragm area (cm.$^2$) will be dictated somewhat by the minimum practical sensitivity of the instrument which, in turn, will be a function of the linear displacement needed to produce reliable readings by the particular strain gage as well as the amplitude of the pressures to be sensed and recorded. Thus, for any electromanometer with a given volume displacement and diaphragm area, there is an ideal combination of values for the tube's cross-sectional area (cm.$^2$) and the pressure dome's chamber 28 (cm.$^3$). As stated, transducers employing these parameters have demonstrated results equal to the results obtained by modifying the Statham arrangement. Applying the principles to the Statham arrangement having a volume displacement of $1 \times 10^{-5}$ cm.$^3$ per 10 cm. of applied mercury pressure and a diaphragm area of 0.33187 cm.$^2$, the ideal values for tube diameter and pressure dome chamber capacity are found to be 0.0279 cm. and 0.025 cm.$^3$ respectively.

Obviously many modifications and variations of the present invention are possible in the light of the above teachings. It is therefore to be understood that within the scope of the appended claims the invention may be practiced otherwise than as specifically described.

I claim:

1. A pressure transducer of a type adapted to be inserted into microvessels having a size range of 5–30 microns for conducting microhemocirculatory studies comprising:
   a closed chamber formed with a flat base having a diaphragm portion and with sidewalls converging into a central opening,
   a microcannula having a tip externally sized for insertion into said microvessels and having its bore communicating with said chamber through said opening,
   a pressure-transmitting fluid body filling said chamber and cannula, and
   a sensor responsively coupled to said base diaphragm for detecting diaphragm displacements produced by volume changes of said fluid body due to circulatory pressure variations,
   said chamber volume being no greater than about 0.25 cc. and the internal diametric area of the cannula being no greater than about 0.28 mm., and
   the diaphragm area and volume displacement being selected in accordance with the circulatory inputs to be studied and the sensor characteristics.

2. The transducer of claim 1 wherein the design parameters are based upon the following relationship:

$$\text{Chamber volume} = \frac{(\text{volume displacement})(\text{cannula ID area})}{K\ (\text{diaphragm area})}$$

in which $K$ is a dimensionless proportionality constant having a value of about $3.789 \times 10^{-6}$.

3. The transducer of claim 2 wherein said fluid of the pressure-transmitting body is a bile salt solution characterized by having a surface tension about one-half that of an aqueous solution of sodium chloride and by being physiologically inert.

4. The transducer of claim 3 wherein said solution is 0.001 molar sodium taurocholate in 0.9 percent sodium chloride.

5. An improved pressure transducer for microhemocirculation studies of microvessels having a size range of 5–30 microns, the transducer being of a type having a conelike cavity formed of a flat base and sidewalls projecting angularly of the base toward an apex, the cavity being filled with a pressure-transmitting fluid and its flat base including a diaphragm exposed to said fluid for dynamically transmitting fluid pressure variations to a sensor, said cavity further being in fluid communication with a microbore needle having a bore diametric area of no greater than about 0.28 mm. and adapted to be directly exposed to vascular pressure variations, said improvement comprising:
   a cavity in which said sidewalls project at an angle of between 1.5°–2.5° and the normal volume of said cavity is in the order of 0.025 cubic centimeters.

6. The improved pressure transducer of claim 5 wherein the fluid in said cavity and microbore is a bile salt solution characterized by having a surface tension about one-half that of an aqueous solution of sodium chloride and by being physiologically inert.

7. The improvement of claim 6 wherein said solution is 0.001 molar sodium taurocholate in 0.9 percent sodium chloride.

* * * * *